United States Patent
Martin et al.

(10) Patent No.: US 10,024,713 B1
(45) Date of Patent: Jul. 17, 2018

(54) VIBRISSA SENSOR

(71) Applicants: William N Martin, Middletown, RI (US); Jarrod H Wasko, West Kingston, RI (US); Joy M Lapseritis, Falmouth, MA (US); Paul R Temple, Bristol, RI (US); Christin T Murphy, Newport, RI (US)

(72) Inventors: William N Martin, Middletown, RI (US); Jarrod H Wasko, West Kingston, RI (US); Joy M Lapseritis, Falmouth, MA (US); Paul R Temple, Bristol, RI (US); Christin T Murphy, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 187 days.

(21) Appl. No.: 15/281,157

(22) Filed: Sep. 30, 2016

(51) Int. Cl.
*G01H 11/02* (2006.01)
(52) U.S. Cl.
CPC .................... *G01H 11/02* (2013.01)
(58) Field of Classification Search
CPC .................. G01H 11/02; G01H 1/00
USPC .......................................................... 73/661
See application file for complete search history.

(56) References Cited

U.S. PATENT DOCUMENTS

| | | | |
|---|---|---|---|
| 7,774,951 B2 | 8/2010 | Hartmann et al. | |
| 2008/0202222 A1* | 8/2008 | Woody | B25J 7/00 73/105 |
| 2008/0235972 A1* | 10/2008 | Hartmann | G01B 5/207 33/732 |
| 2014/0283604 A1* | 9/2014 | Najafi | G01P 15/125 73/514.32 |
| 2016/0054349 A1* | 2/2016 | Stonas | G01P 5/02 73/170.11 |

OTHER PUBLICATIONS

A.G.P. Kottapalli, M. Asadnia, H. Hans, J.M. Miao, and M.S. Triantafyllou, Harbor Seal Inspired Mems Artificial Micro-Whisker Sensor, Article, 2014, pp. 741-744, IEEE, USA.

* cited by examiner

*Primary Examiner* — John Chapman, Jr.
(74) *Attorney, Agent, or Firm* — James M. Kasischke; Michael P. Stanley

(57) ABSTRACT

A vibration sensor for a fluid environment includes a vibrissa that can be positioned in the fluid environment. The vibrissa is joined to a cantilever body having magnets positioned thereon. Cantilever body is supported by a resilient support member in an interior hollow within a housing. Support member allows movement of body in two dimensions while supporting the body in a third dimension. Magnetic sensors corresponding to the magnets on the body are positioned on the housing for detecting movement of the body caused by the vibrissa. In various embodiments, the support member can be a membrane shielding the housing interior from environmental fluid flow.

15 Claims, 5 Drawing Sheets

VIBRISSA SENSOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention provides a hydrodynamic sensor utilizing a fiber having an instrumented base for monitoring hydrodynamic and fluid properties.

(2) Description of the Prior Art

Harbor seals and many other pinnipeds use their vibrissae or whiskers, to find prey underwater by hydrodynamic not optical tracking. The pinnipeds that use this method are sensing motions at the bases of the vibrissae, as the vibrissae themselves are not innervated. The base of a vibrissa is called the follicle-sinus complex (FSC). In addition to growing and holding the vibrissa in place within the mystacial pad, the FSC is innervated. The FSC statically and dynamically translates displacement, force, rotation, and moment into neural signals which the pinnipeds utilize in catching their prey.

Studies have shown that the seal vibrissae are extremely stable and that drag is reduced. It has been suggested that seals use changes in this stability to chase prey. Drag reduction is advantageous in many hydrodynamic communities. The interaction between the fluid and vibrissae has been studied by computational fluid dynamic modeling as well as by particle image velocimetry. Experimentation has also been done on the threshold of vibrations in frequency and amplitude that can be sensed through the vibrissae by experiments involving rewards for detecting signals transmitted through a metal rod that the seal touched with its vibrissae.

Seal whisker phenomena are becoming a topic of interest in many hydrodynamic studies. There is considerable interest their drag reduction capabilities. Applications involving their vortex shedding suppression are relevant to the aerospace industry and can easily be extended to marine industries by way of strum reduction for guy wires and other cylindrical structures.

Seal whisker sensors have been fabricated for use in research. In hydrodynamic research, a seal whisker was joined at its base to a spring gimbal and subjected to flow conditions. Fluid flow and the whisker were then observed by a camera. In other research, an artificial whisker fabricated by stereolithography was fastened to a piezoelectric sensing base. The sensor was then used to detect vibrations in a water tank. The piezoelectric sensing base provided electrical signals when the whisker was subjected to vibrations in a single direction.

Sensors with whisker elements have been used to detect static or low frequency sensor deflection to determine object distance, fluid velocity profile or object contours. These sensors are not adapted for high frequency use. In these sensors, the whisker is mounted so that the base of the whisker can't rotate. Bending moments in the whisker induce stress in the base which is measured as strain.

Thus, there is a need for a sensor utilizing a vibrissa that can detect dynamic and high frequency movement of the vibrissa in two dimensions.

SUMMARY OF THE INVENTION

Accordingly, it is an object of the present invention to provide a sensor capable of measuring vibrissa movement;

Another object is to provide a vibrissa sensor that can be used in a hydrodynamic environment; and Yet another object is to provide a vibrissa sensor that is capable of measuring high frequency phenomena.

In view of these objects, there is provided a vibration sensor for a fluid environment that includes a vibrissa that can be positioned in the fluid environment. The vibrissa is joined to a cantilever body having magnets positioned thereon. Cantilever body is supported by a resilient support member in an interior hollow within a housing. Support member allows movement of body in two dimensions while supporting the body in a third dimension. Magnetic sensors corresponding to the magnets on the body are positioned on the housing for detecting movement of the body caused by the vibrissa. In various embodiments, the support member can be a membrane shielding the housing interior from environmental fluid flow.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
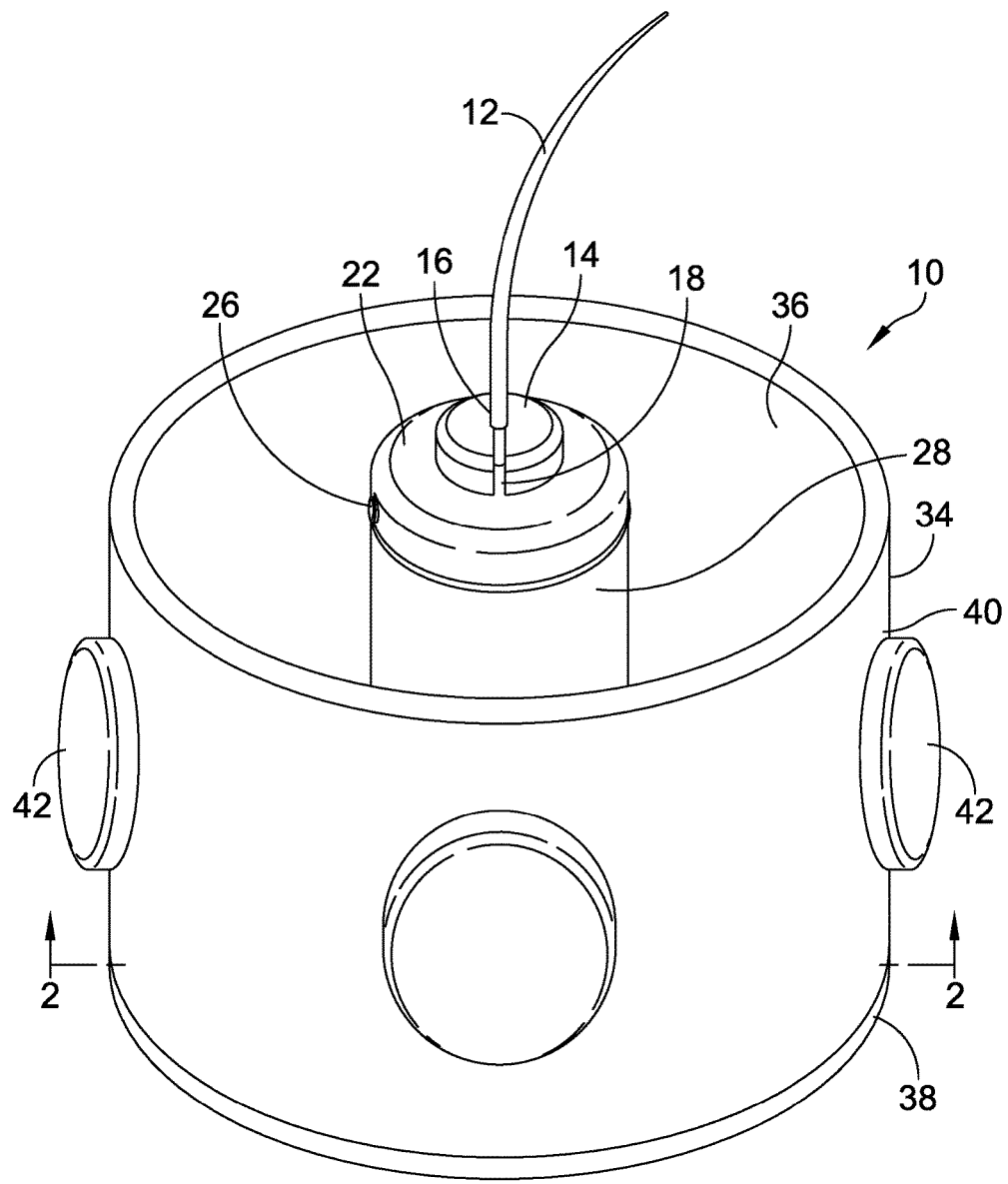
FIG. 1 is a perspective view of one embodiment of the sensor.
Figure 2:
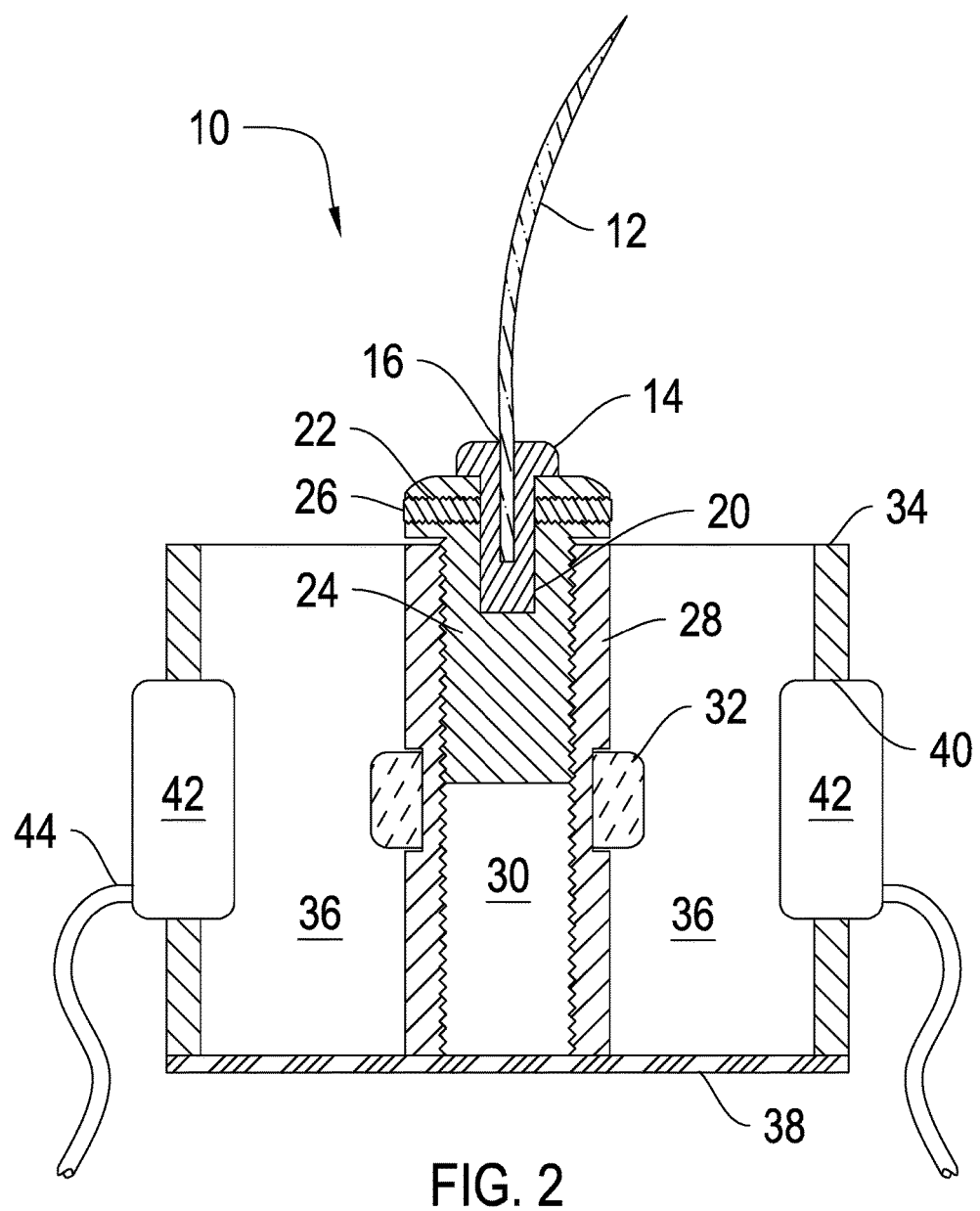
FIG. 2 is a sectional view of the embodiment shown in FIG. 1 taken along line 2-2 of FIG. 1.

FIG. 1 provides a perspective view of a first embodiment of a sensor 10 utilizing a vibrissa 12. FIG. 2 is a cross-sectional view of sensor 10 taken along line 2-2 of FIG. 1. Vibrissa 12 is positioned in a collet 14 having an aperture 16. Slot 18 allows compression of collet 14 allowing gripping of vibrissa 12. Collet 14 is positioned in a collet aperture 20 formed in head 22 of screw 24. Screw head 22 has set screws 26 therein for retaining and compressing collet 14. Screw 24 is threaded into a cantilever body 28. Cantilever body 28 has an internally threaded cavity 30 therein for receiving screw 24. Magnets 32 are positioned on the exterior of cantilever body 28.

A sensor housing 34 having a hollow interior 36 is provided. Cantilever body 28 is positioned in sensor housing 34 interior 36 such that vibrissa 12 can extend upward and beyond housing 34. A flexible membrane 38 is provided for supporting cantilever body 28 within housing 34. In this embodiment, flexible membrane 38 is mounted to a bottom end of housing 34 and a bottom end of cantilever body 28. Housing 34 can further have mounting apertures 40 formed therein and extending from an exterior surface of housing 34 to hollow interior 36. Mounting apertures 40 are positioned at locations corresponding to magnets 32 on cantilever body 28. Magnetic sensors 42 can be mounted in apertures 40. In one embodiment, magnetic sensors 42 are wire coils wound on spools that are aligned with magnets 32; however, magnetic sensors 42 can be a wide variety of magnetic sensors including inductive pickup coils, fluxgate devices, Hall effect devices or the like. Wire leads 44 from sensors 42 can be routed through membrane 38 or alternatively leads 44 can be routed exterior to housing 34.

Figure 3:
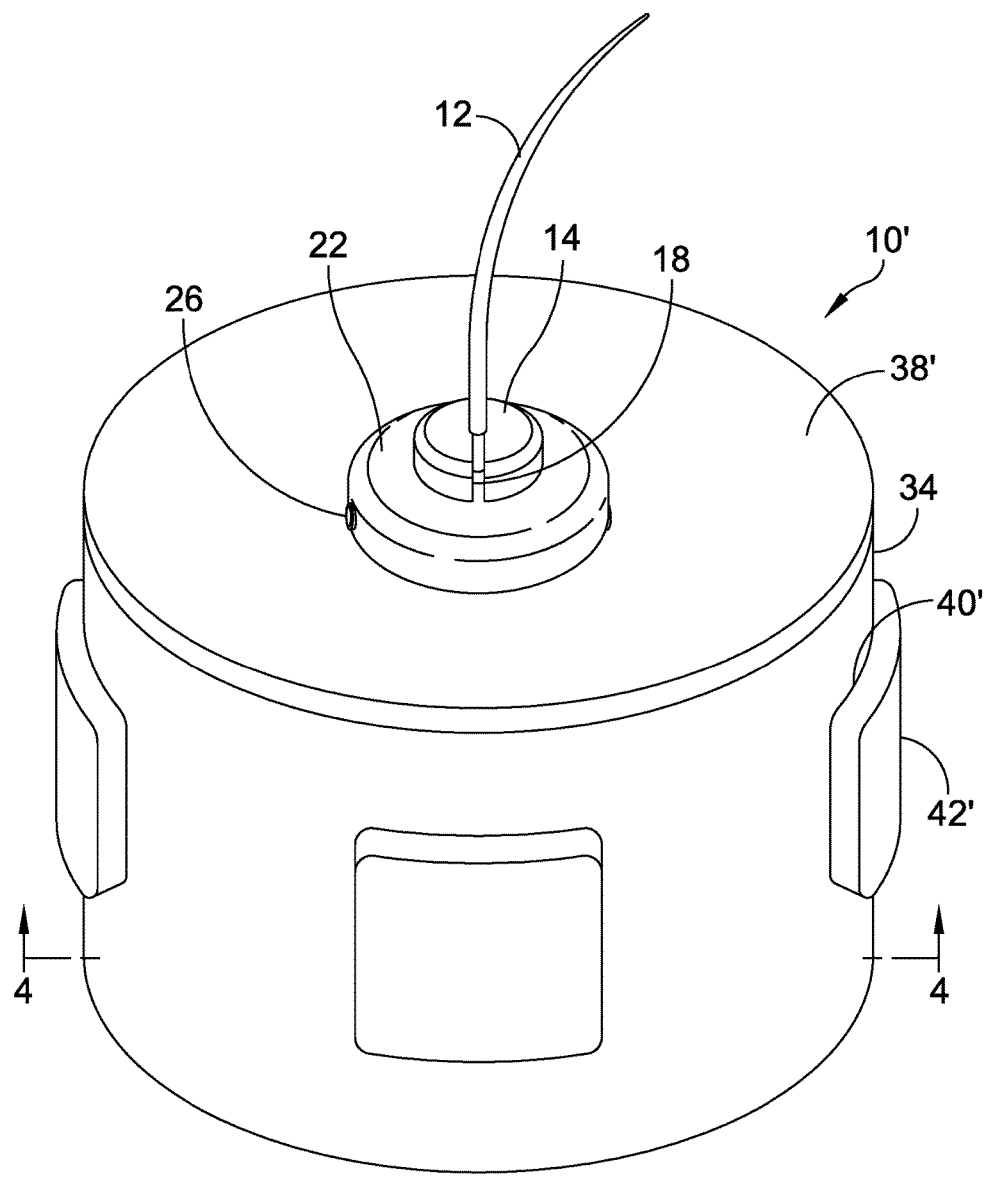
FIG. 3 is a perspective view of a second embodiment of the sensor.
Figure 4:
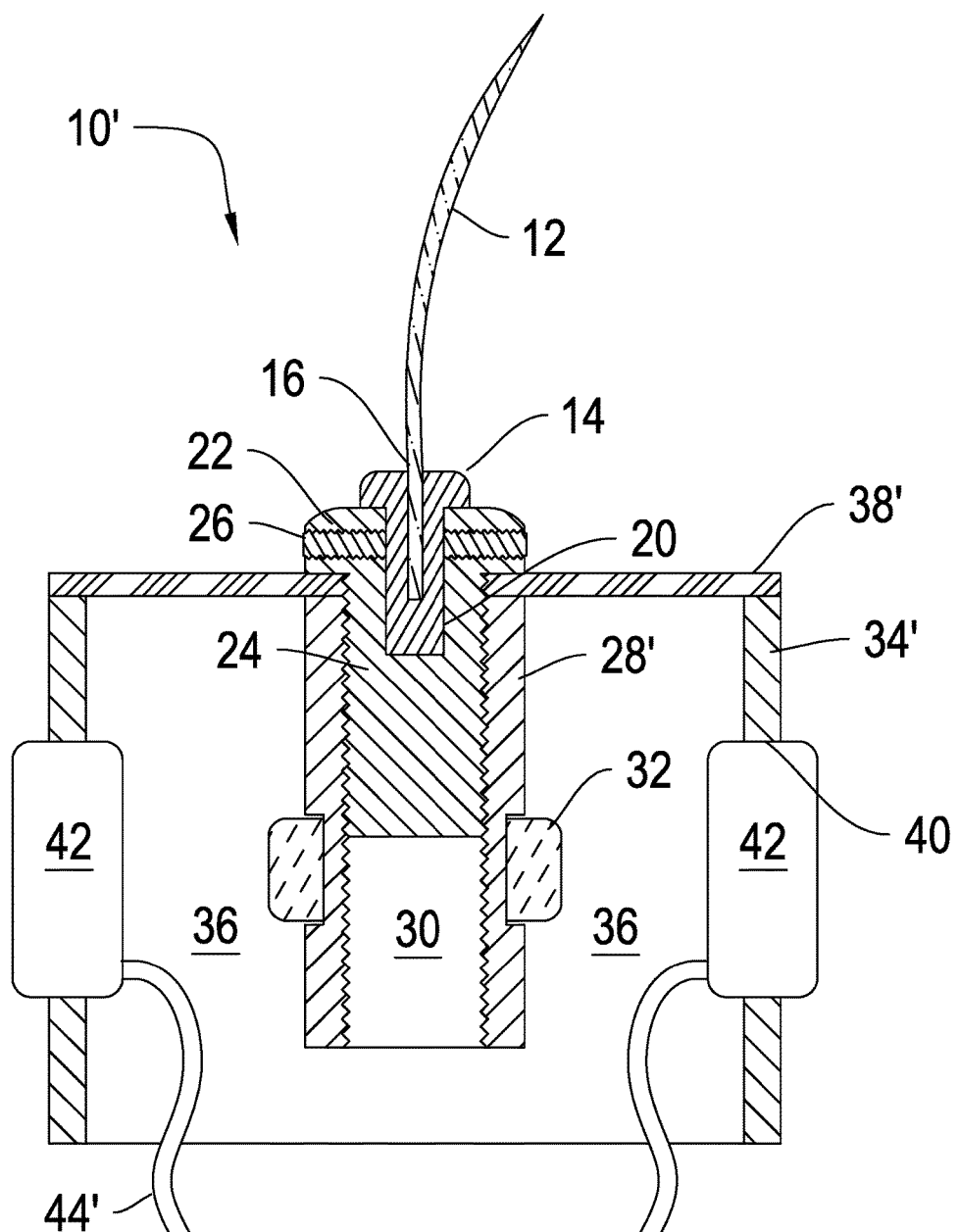
FIG. 4 is a sectional view of the embodiment shown in FIG. 3 taken along line 4-4 of FIG. 3.

In another embodiment shown in FIG. 3, membrane 38' can be joined to a top end of housing 34'. FIG. 4 provides a cross-sectional view of this embodiment. Membrane 38' can have a circular aperture therein, and screw 24 head 22 can compress membrane 38' between head 22 and body 28. This embodiment allows cantilever body 28 to pivot when housing 34 is mounted on a surface. It also changes the pivot point of vibrissa sensor 10' and changes vibrational modes and forces. Mounting apertures 40' are shown as rectangular having rectangular magnetic sensors 42' therein. Leads 44 can be routed through the interior of housing 34 without making an aperture in membrane 38'. In this embodiment, interior 36 can be filled with ambient fluid or oil in order to operate in a fluid environment.

Figure 5:
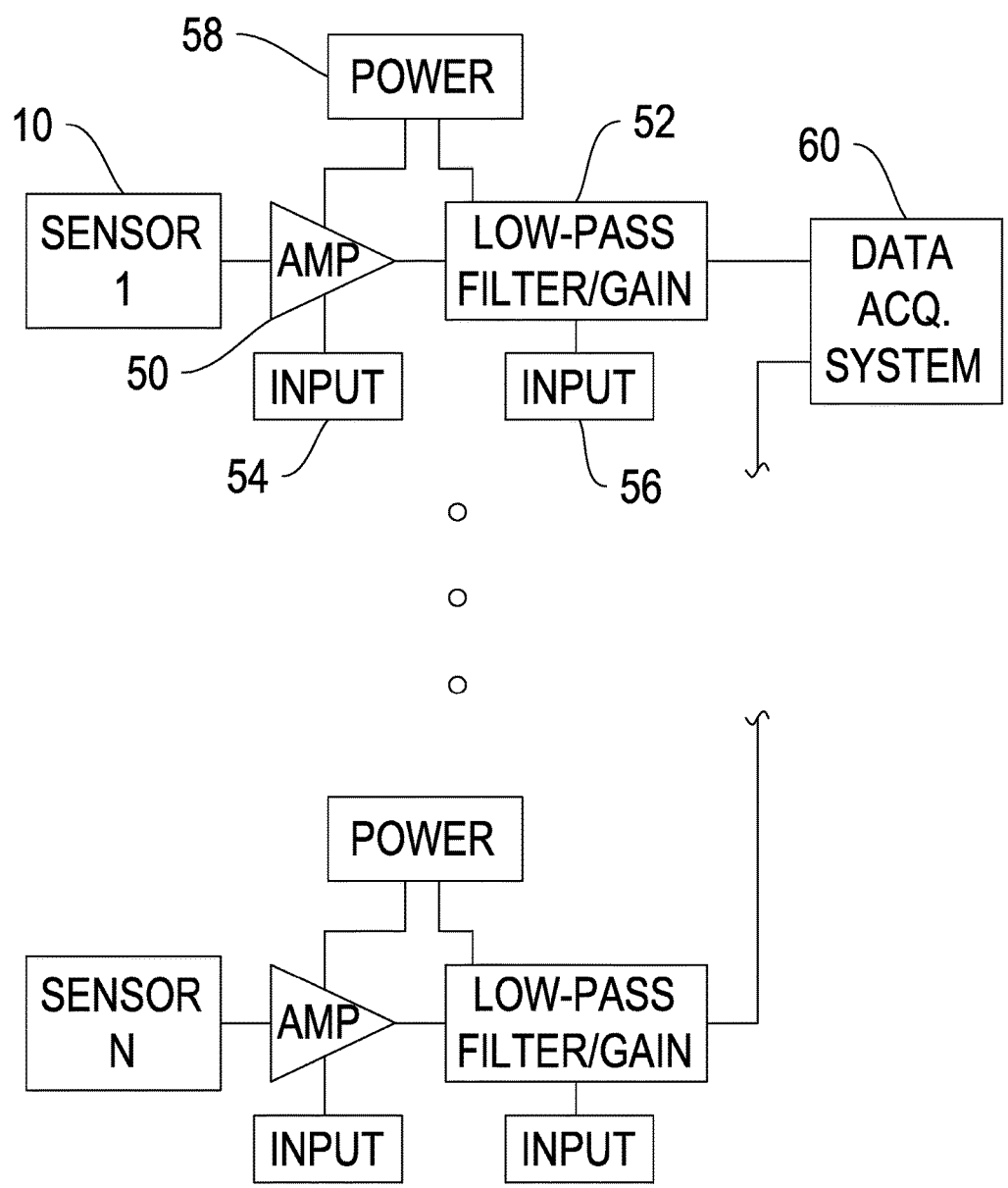
FIG. 5 is a block diagram of a circuit utilized for capturing signals from the sensor.

All embodiments will have a low current or voltage output at leads 44, and the amplifier and filter circuit was designed to read these signals. FIG. 5 gives a block diagram of the circuitry. For each lead, this design features a high-gain differential amplifier stage 50, followed by an 8th order multiple feedback topology, low-pass filter stage 52 with gain. Amplifier stage 50 has an input 54 allowing adjustment of gain and offset. Likewise, low-pass filter stage 52 has an input 56 allowing adjustment of gain and filtering. Inputs 54 and 56 can be separate for each stage to allow balancing of different sensor signals. The design approach is low-power and low-noise. Power is applied to the circuit by either external power supply or batteries 58. Low pass filter stage 52 should be joined to a data acquisition system 60 for recording or further processing. As shown, a plurality of amplifiers and filters can be provided with one set corresponding to each sensor input. For field use, overvoltage and electrostatic discharge protection should be incorporated into the design. In one embodiment, the first stage gain is over 40 dBV, followed by a second stage gain of over 20 dBV. Global gain is on the order of 66 dBV which results in a several volt output signal from approximately a 1 mV input signal. The frequency range of the circuit is from approximately 1 Hz to 10 kHz and magnitude response is flat across the band.

In operation, external factors such as fluid flow affect the vibrissa 12 which moves cantilever body 28 and magnets 32. Cantilever body 28 is supported by membrane 38 which also supplies a centering/restoring force to body 28. Additional membranes or other spring structures can be provided along the length of cantilever body 28 to tailor stiffness properties and end conditions as needed to affect the desired sensor mechanical impedance. Movements of magnets 32 are picked up by magnetic sensors 42 without contacting magnets 32. In inductive coil sensors, the change in the magnetic field is transformed into small voltage changes as the magnets 32 are moved due to motion of the mounted vibrissa or other object 12. As stiffness properties are adjusted, calibration will be required. The displacement at the magnet 32 will correspond to a velocity imparted to the vibrissa 12.

A first embodiment of the artificial follicle utilizes coils, Hall effect, or fluxgate sensors to sense the velocity of the moving magnets. Magnets can be placed in a single magnet per direction configuration or in the push-pull configuration shown which utilizes two magnets per measured direction. Cantilever movement should be decoupled from any fluid effects on the coil spools by sealing these components. This has other benefits for corrosion control as well.

A second embodiment of the artificial follicle utilizes fluxgate sensors to sense the velocity of the moving magnets. The fluxgate sensors are a smaller alternative to using inductive coil sensors. A disadvantage of fluxgate sensors is that they require a small power source. The same housing that the sensors are mounted to can be extended to provide a mounting surface for the membrane of the cantilever and to assist in sealing. The volume within the housing and membrane can be filled with oil or some other fluid to resist hydrostatic pressure.

All embodiments will have a low voltage output. The sensor output of the first embodiment can be directed into typical audio amplifiers as found in speaker systems, laptop computers and other devices for producing sound from low voltage signals. The second embodiment needs a power supply to operate the fluxgate sensors. Both embodiments will have electric leads that can be attached to circuitry for data acquisition.

Vibrissae can be shaped like a harbor seal vibrissa, have a uniform cylindrical shape or any other shape dictated by the application. Something other than the collet and set screws arrangement could be used but this would require greater attention concerning alignment. The current sensors are designed to register dynamic motion of the magnets 42; however, some sensors may be able to register static displacements. Inductive sensor coils could be rectangular or a different shape. Many alternatives exist for membrane 38 within ordinary skill in the art. For example, membrane 38 could be replaced by a gimbal. The gimbal could be made from elastomeric material. Non-magnetic sensors could be used to detect proximity. This could be by laser reflection.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A vibration sensor for a fluid environment comprising:
   a vibrissa having first and second end, said first end being positionable in the fluid environment;
   a cantilever body joined to said vibrissa second end;
   at least one magnet positioned on said cantilever body;
   a resilient support member joined to said cantilever body for supporting said cantilever body in a first dimension while allowing pivotal movement of said cantilever body in a second dimension and third dimension;

a housing defining a hollow interior region, said housing being joined to said resilient support member such that said resilient support member supports said cantilever body in said housing hollow interior region; and at least one magnetic sensor positioned on said housing in communication with said housing hollow interior region for detecting movement of said at least one magnet with respect to said housing.

2. The apparatus of claim 1 wherein said resilient support member is a membrane positioned on said housing to seal said housing hollow interior region from influence by the fluid environment.

3. The apparatus of claim 2 further comprising a fluid within said housing interior region.

4. The apparatus of claim 1 wherein said resilient support member is joined to said cantilever body between said at least one magnet and said cantilever body portion supporting said vibrissa.

5. The apparatus of claim 1 wherein said resilient support member is joined to said cantilever body at a location distal from said cantilever body portion supporting said vibrissa.

6. The apparatus of claim 1 further comprising:

a collet having a slot wherein said vibrissa is received in the slot; and wherein said cantilever body has a means for receiving and retaining said collet.

7. The apparatus of claim 6 wherein said cantilever body has a threaded cavity therein, and said means for receiving and retaining said collet comprises:

a screw having a collet aperture therein and at least one set screw aperture in communication with said collet aperture, said collet being positioned in said collet aperture, and said screw being positioned in said cantilever body threaded cavity; and a set screw within said set screw aperture in contact with said collet for retaining said collet.

8. The apparatus of claim 7 wherein said screw is utilized to join said resilient support member to said cantilever body between said at least one magnet and said cantilever body portion supporting said vibrissa.

9. The apparatus of claim 8 wherein said resilient support member is a membrane positioned on said housing to seal said housing hollow interior region from influence by the fluid environment.

10. The apparatus of claim 9 further comprising a fluid within said housing interior region.

11. The apparatus of claim 6 wherein said resilient support member is joined to said cantilever body at a location distal from said cantilever body portion supporting said vibrissa.

12. The apparatus of claim 1 wherein said at least one magnetic sensor is an inductive coil.

13. The apparatus of claim 1 wherein said at least one magnetic sensor is a fluxgate sensor.

14. The apparatus of claim 1 wherein said vibrissa is a natural fiber.

15. The apparatus of claim 1 wherein said vibrissa is an artificial fiber.

* * * * *